United States Patent [19]
Akiyama et al.

[11] Patent Number: 5,264,154
[45] Date of Patent: Nov. 23, 1993

[54] SINGLE CRYSTAL SCINTILLATOR

[75] Inventors: Seikichi Akiyama, Mito; Hiroyuki Ishibashi, Tsukuba; Takeshi Utsu, Hitachi, all of Japan; Charles L. Melcher, West Redding; Jeffrey S. Schweitzer, Ridgefield, both of Conn.

[73] Assignee: Hitachi Chemical Co., Ltd., Tokyo, Japan

[21] Appl. No.: 31,051

[22] Filed: Mar. 11, 1993

Related U.S. Application Data

[63] Continuation of Ser. No. 679,476, Apr. 2, 1991, abandoned.

Foreign Application Priority Data

Apr. 20, 1990 [JP]  Japan .................................. 2-106292

[51] Int. Cl.$^5$ .............................................. C09K 11/79
[52] U.S. Cl. ............................ 252/301.4 F; 250/483.1
[58] Field of Search ............... 252/301.4 F; 250/483.1

[56] References Cited

U.S. PATENT DOCUMENTS

| | | | |
|---|---|---|---|
| 4,647,781 | 3/1987 | Takagi et al. | 250/483.1 |
| 4,883,956 | 11/1989 | Melcher et al. | 250/269 |
| 4,891,520 | 1/1990 | Ishibashi et al. | 252/301.4 F |
| 4,958,080 | 9/1990 | Melcher | 252/301.4 F |
| 4,988,882 | 1/1991 | Francois et al. | 252/301.4 F |
| 5,015,860 | 5/1991 | Moses | 250/361 R |
| 5,015,861 | 5/1991 | Derenzo et al. | 250/361 R |
| 5,025,151 | 6/1991 | Melcher | 252/301.4 F |

*Primary Examiner*—Jack Cooper
*Attorney, Agent, or Firm*—Leonard W. Pojunas

[57] ABSTRACT

A single crystal scintillator and apparatus for prospecting underground strata using the scintillator is described. The single crystal scintillator is a cerium doped gadolinium silicate compound of the formula:

$$Gd_{2-(x+y)}Ln_xCe_ySiO_5$$

wherein Ln is Sc, Tb, Lu, Dy, Ho, Er, Tm, or Yb; $0.03 \leq x \leq 1.9$; and $0.001 \leq y \leq 0.2$.

3 Claims, 2 Drawing Sheets

SINGLE CRYSTAL SCINTILLATOR

This application is a file wrapper continuation of parent application Ser. No. 7/679,476, filed Apr. 2, 1991, now abandoned.

FIELD OF THE INVENTION

This invention concerns a single crystal scintillator widely used in the field of radiotherapeutics, physics, biology, chemistry, mineralogy, and oil exploration, for example, in positron CT (computed tomography) for medical diagnosis or for measuring cosmic rays or detecting underground resources.

BACKGROUND OF THE INVENTION

A single crystal scintillator of thallium-doped sodium iodide [NaI(Tl)], which has been widely used as a radiation detector, costs relatively little to produce and gives high light output in response to radiation. It is therefore used, instead of a Geiger counter, for many applications including high energy physics studies and exploring oil reservoirs. This scintillator has many defects, however. The radiation detection efficiency is low due to the low density of NaI(Tl) which requires a large detector. The radiation counting ability is lower due to a long fluorescence and afterglow decay time which results in blurring or merging of fluorescence signals. Handling at high temperatures and high humidity is difficult due to deliquescence.

In order to overcome these defects, a bismuth germanate $Bi_4Ge_3O_{12}$ (BGO) scintillator has been used. The BGO scintillator has a high density and radiation absorption rate, but its defects include low light output and long fluorescence decay time.

Also, in order to overcome these defects a single crystal scintillator of cerium doped gadolinium silicate [$Gd_2SiO_5$:Ce] (GSO) has been proposed in Japanese Patent Examined Publication No. 62-8472 corresponding to U.S. Pat. No. 4,647,781. The GSO scintillator, however, has a peak luminescence wavelength of 430 nm, which is outside the maximum 380 nm to 420 nm spectral sensitivity range of the photomultiplier tube with a bi-alkali photocathode, commonly used in combination with these scintillators. Thus the light-electrical signal conversion is not optimum.

U.S. Pat. No. 4,883,956 to Melcher et al. proposes a GSO single crystal scintillator for use in an apparatus for exploring underground formations. Due to the properties of GSO, e.g., relatively small fluorescence output, relatively long decay time (60 ns), and relatively long luminescence wavelength, however, the performance of this apparatus is not very suitable.

In order to have the single crystal scintillator in positron CT or various radiation measuring instruments detect sufficient radiation and to make the apparatus smaller, the radiation absorption rate of the single crystal scintillator should be high. Furthermore, since the performance of the apparatus depends on the extent of the fluorescence output, this output must be large to improve the S/N ratio (fluorescence output signal/noise ratio) of images in an image processing apparatus. Moreover, the decay time must be reduced to improve the counting rate performance which is influenced by pulse pile-up. In addition, to use the fluorescence output effectively, it is better to match the wavelength of the photomultiplier tube which shows the maximum spectral sensitivity with the luminescence wavelength of the single crystal scintillator. It is therefore necessary to improve the luminescence wavelength of the known single crystal scintillators.

OBJECT AND SUMMARY OF THE INVENTION

One object of the present invention is to provide a single crystal scintillator and an apparatus for exploring underground formations to solve the above-mentioned problems. The single crystal scintillator has a luminescence wavelength in good agreement with the maximum spectral sensitivity of a photomultiplier tube with a bi-alkali photocathode. It has been found that it is effective to replace a part of the gadolinium with an element having a smaller ionic radius to obtain a single crystal scintillator with a luminescence wavelength near the maximum spectral sensitivity of the photomultiplier tube.

Another object of the present invention is to provide a single crystal scintillator comprising a cerium doped gadolinium silicate compound represented by the formula:

$$Gd_{2-(x+y)}Ln_xCe_ySiO_5$$

where Ln is at least one element selected from the group consisting of Sc, Tb, Dy, Ho, Er, Tm, Yb and Lu; x is a value between 0.03 and 1.9; and y is a value between 0.001 and 0.2, and an apparatus for exploring underground formations using the same.

DETAILED DESCRIPTION

Figure 1:
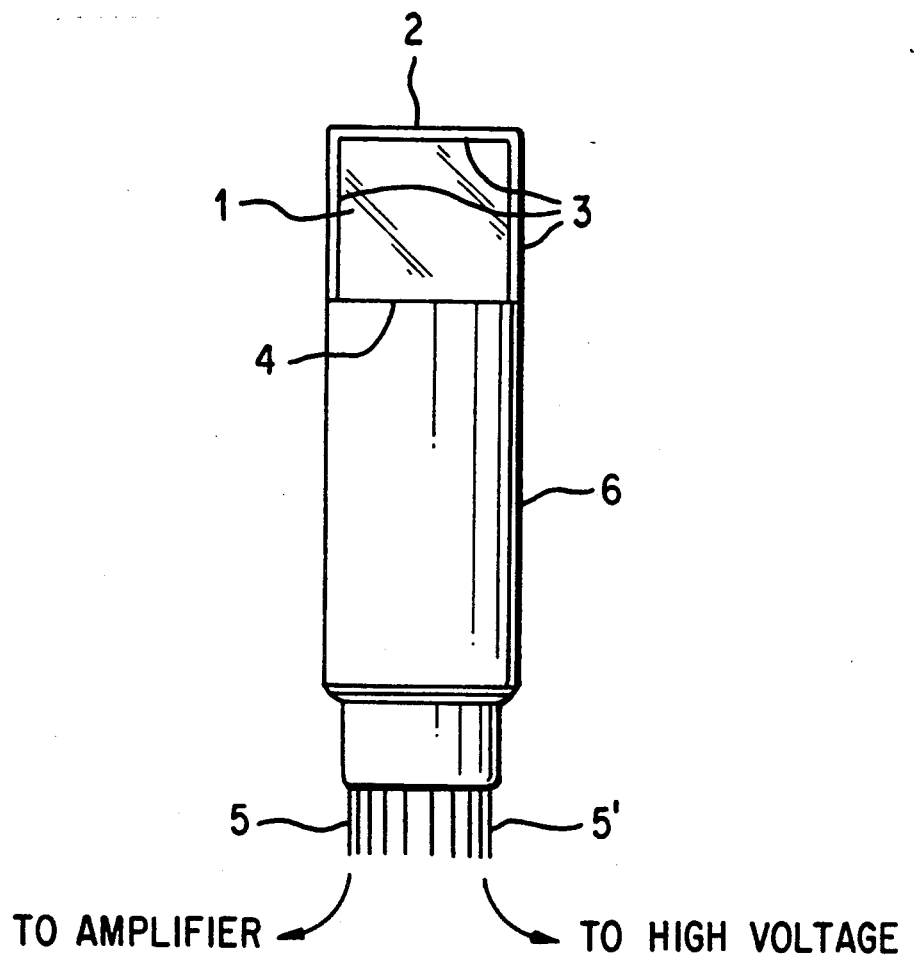
FIG. 1 is a schematic view showing a structure of a radiation detecting means that goes in an apparatus for exploring subsurface earth formations using the single crystal scintillator of the present invention.

The single scintillation crystals of the present invention can be produced by a conventional process such as the Czochralski method, or the like as described, for example, in "Crystal Pulling" by C. D. Brandle, *Crystal Growth*, Brian R. Pamplin, editor, Pergamon Press, 1980, pp. 275–300. Since the melting point of the cerium doped gadolinium silicate compound is high, about 1900° C., a crucible made of iridium or the like is used. The number of revolutions, atmospheric gas, etc. are selected according to the conditions, and there are no particular limitations. Since iridium vaporizes rapidly when exposed to high temperature in air, an inert gas is used with the iridium crucible.

The above-mentioned single crystal scintillator is effective when used in an apparatus for exploring underground formations, particularly for oil and the like. The apparatus of the present invention for exploring underground formations comprises a prospecting element equipped with a radiation detecting means and a combining means for converting the detected light to signals and recording them. The detecting means comprises a single crystal scintillator, a container, a reflective material, a photomultiplier tube, etc. such as described in U.S. Pat. No. 4,883,956. The single crystal scintillator is housed in a container which can transmit radiation such as gamma rays. One surface of the single crystal scintillator is connected to the photomultiplier tube and another surface is covered with polytetrafluoroethylene, barium sulfate powder, magnesium oxide powder, aluminum foil, titanium oxide paint, etc. as the reflective material to collect the light generated on the connecting surface to the photomultiplier tube as much as possible. The single crystal scintillator can be directly connected with the photomultiplier tube or can be connected via a light guide tube, an optical fiber, a lens, a mirror, etc. The photomultiplier tube is further connected, using a conventional method, with an amplifier, a recorder, etc. used as the combining means.

The reasons for shortening the luminescence wavelength by partly replacing the gadolinium with an element having a smaller ionic radius are as follows: the intensity of the crystal field influencing the cerium ions, which are luminescence centers, is determined by the gadolinium (or other element replacing a part of the gadolinium) around the cerium ions. When the elements around the cerium ions are changed from gadolinium to an element with a smaller ionic radius, the ionic space of the cerium ions is enlarged and the intensity of the crystal field around the cerium ions appears to be weakened. The luminescence of the cerium ions is based on the energy transfer from the 5d energy level to the 4f energy level. The 5d energy level in a crystal is split depending on the intensity of the crystal field, and the size of the energy gap relating to the emission transition decreases as the intensity of the crystal field increases. Therefore, when the crystal field is weak, the energy gap is relatively large. When the energy gap relating to the emission transition increases, so does the energy of the released photons. Therefore the luminescence wavelength decreases.

As mentioned above, by replacing a part of the gadolinium with another element Ln, the luminescence wavelength of the single crystal seems to move closer to the wavelength corresponding to the maximum spectral sensitivity of a bi-alkali photomultiplier tube.

According to the present invention, when the value of y in the above-mentioned general formula is less than 0.001, the fluorescence output decreases, whereas when y is more than 0.2, the crystals are slightly colored which worsens the light transmittance. A value of y in the range of 0.003 to 0.02 is preferable since the fluorescence output is greatest in that range. On the other hand, when the value of x is less than 0.03, the luminescence wavelength of the single crystal scintillator is shifted from the maximum spectral sensitivity of the photomultiplier tube. When x is more than 1.9, crystals of good quality cannot be obtained. The preferred value of x is in the range of 0.1 to 0.7 where crystals of the best quality can be obtained.

The use of Lu as the element Ln is preferred since the luminescence wavelength of the resulting single crystal comes closest to the wavelength of the maximum spectral sensitivity of the photomultiplier tube.

EXAMPLES

The present invention is illustrated by the following examples.

EXAMPLE 1

Oxide starting materials of $Gd_2O_3$, $Lu_2O_3$, $CeO_2$ and $SiO_2$, each having a purity of 99.99 to 99.999%, were mixed to give a composition of

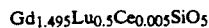

$Gd_{1.495}Lu_{0.5}Ce_{0.005}SiO_5$ (LuGSO). The mixture weighing 450 g was placed in a crucible made of iridium (diameter 50 mm, height 50 mm), and heated at about 1900° C. in a nitrogen atmosphere by high frequency heating. A single crystal was grown using the Czochralski method at a crystal pulling rate of 1 mm/hr and a rotation rate of 35 rpm.

A seed crystal was immersed in the melt having a surface temperature of 1890° C. (measured using a pyrometer) and gradually pulled up while revolving to grow a single crystal under the seed crystal. As a result, a single crystal having a diameter of about 25 mm, a length of about 60 mm, and a weight of about 300 g was obtained. The single crystal was colorless and transparent.

COMPARATIVE EXAMPLE 1

Oxide starting materials of $Gd_2O_3$, $CeO_2$ and $SiO_2$, each having a purity of 99.99 to 99.999%, were mixed to give a composition of

$Gd_{1.995}Ce_{0.005}SiO_5$ (GSO). The mixture weighing 450 g was placed in a crucible made of iridium and the crystal grown by the Czochralski method in a nitrogen atmosphere in the same manner as described in Example 1. The GSO single crystal obtained was colorless and transparent.

Each sample was $10 \times 10 \times 10$ mm after being cut from the single crystal boules obtained in Example 1 and Comparative Example 1 and polished to obtain a mirror-like surface. The luminescence wavelength was measured. The light output was measured by using $^{137}Cs$ as a radiation source. The photomultiplier tube used was a R878 manufactured by Hamamatsu Photonics Co.

Figure 2:
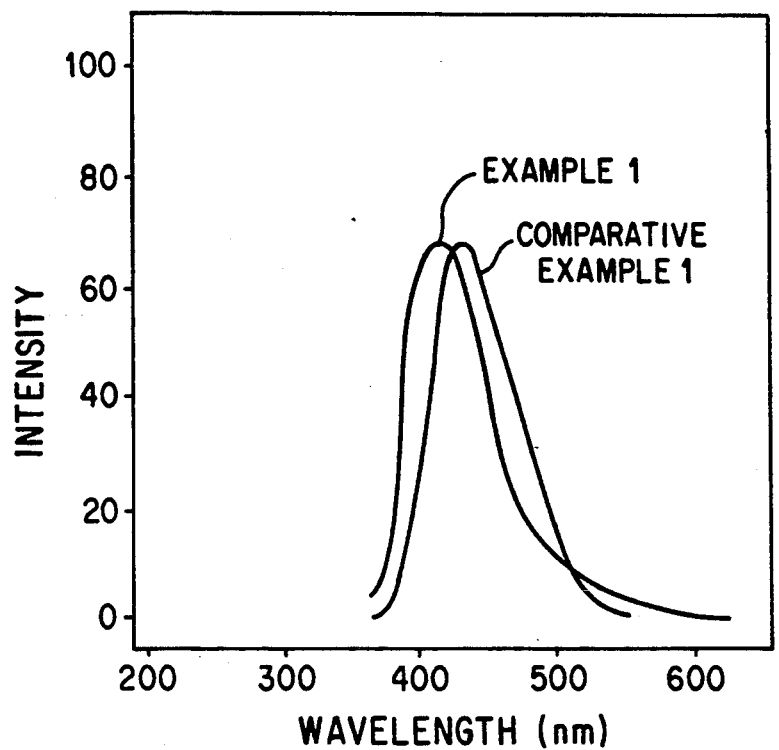
FIGS. 2 and 3 are graphs showing the luminescence wavelength distribution and the fluorescence decay properties of the single crystal scintillator of the present invention.
Figure 3:
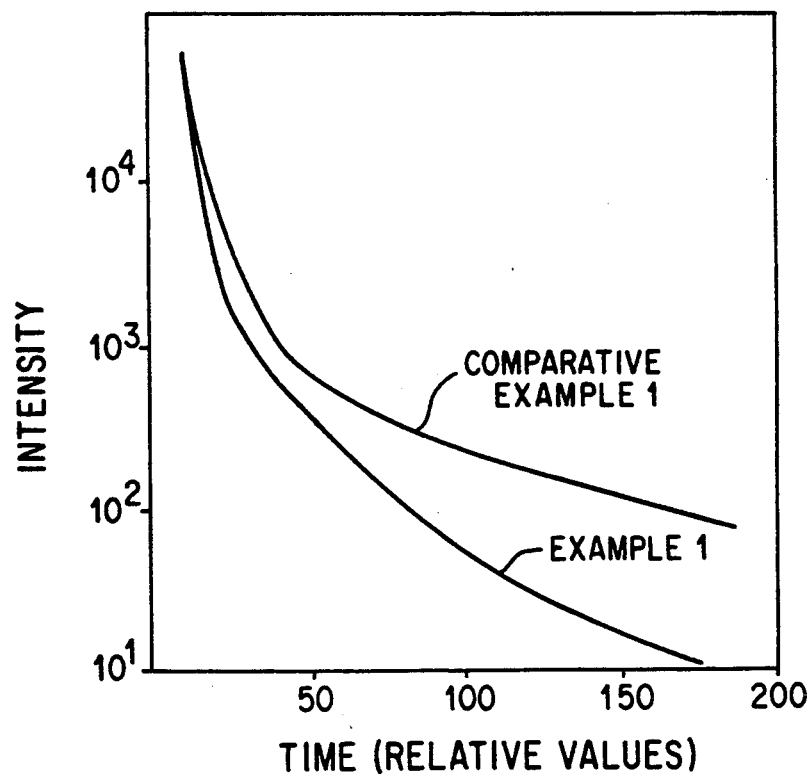

The results of measurements and other properties are shown in Table 1 and FIGS. 2 and 3. FIG. 2 shows the luminescence wavelength distribution and FIG. 3 shows the scintillation decay properties.

TABLE 1

| Example No. | Example 1 | Comparative Example 1 |
|---|---|---|
| Light output | 2 | 1 |
| Decay time (ns) | 30 | 60 |
| Luminescence wavelength (nm) | 416 | 430 |
| Density (g/cm3) | 7.0 | 6.7 |
| Hygroscopicity | None | None |

As is clear from Table 1 and FIGS. 2 and 3, the luminescence wavelength of LuGSO of Example 1 is 416 nm which is shorter than the known GSO (Comparative Example 1) of 430 nm. This shorter wavelength is more suitable to the spectral sensitivity of a bi-alkali photomultiplier tube and radiation detection can therefore be carried out more advantageously. Furthermore, LuGSO has a decay time which is twice as fast; it also has twice the light output and a larger density than the known GSO. Moreover, LuGSO is not hygroscopic, unlike NaI(Tl), and shows good results.

EXAMPLE 2

One example of the apparatus for exploring underground earth formations of the present invention is explained below.

FIG. 1 shows a radiation detecting means incorporated into a prospecting element movable in a borehole dug in a formation. In FIG. 1, numeral 1 indicates the single crystal scintillator of the present invention housed in a container 2 made of aluminum and capable of transmitting gamma rays. One surface 4 of the scintillator 1 is optically combined with a photosensitive surface of a photomultiplier tube 6. The other surfaces 3 of the scintillator 1 are covered with a barium sulfate powder as a reflective agent. The scintillator 1 emits light depending on an incident gamma ray energy. The emitted light is reflected directly or by the reflective agent into the photomultiplier tube 6 where the light is converted to electric signals, which are led to a pulse height amplifier via a lead wire 5 as shown by an arrow, followed by display and recording. On the other hand, the photomultiplier tube 6 is connected to a high voltage electric source via a lead wire 5' as shown by an arrow.

The single crystal scintillator of the present invention has a strong emission at a wavelength within the maximum spectral sensitivity of a bi-alkali photomultiplier tube compared with known GSO single crystal scintillators. Furthermore, the light output and decay time are excellent compared with known GSO single crystal scintillators. In particular, LuGSO, which substitutes lutetium for a portion of the gadolinium in GSO, has twice the light output and half the decay time as known GSO.

Therefore, the single crystal scintillator of the present invention exceeds known GSO single crystal scintillators in many properties important for use as a gamma-ray detector, e.g., light output, energy resolution, efficient detection of high energy photons, scintillator decay time, emission spectrum match to photomultiplier tube response, etc.

Thus, the single crystal scintillator of the present invention can be suitably used in positron CT and various radiation measuring devices, especially apparatuses used in the investigation of subsurface earth formations.

We claim:

1. A single crystal scintillator comprising a cerium doped gadolinium silicate compound represented by the formula:

$$Gd_{2-(x+y)}Ln_xCe_ySiO_5$$

wherein Ln is at least one element selected from the group consisting of Sc, Tb, Dy, Ho, Er, Tm, Yb and Lu; x is a value between 0.1 and 0.7; and y is a value between 0.001 and 0.2.

2. A single crystal scintillator according to claim 1, wherein y is a value between 0.003 and 0.02.

3. A single crystal scintillator according to claim 2, wherein Ln is an element of Lu.

* * * * *